UNITED STATES PATENT OFFICE.

ALLEN T. PERRY, OF CLEVELAND, OHIO.

IMPROVEMENT IN PAVING AND ROOFING COMPOUNDS.

Specification forming part of Letters Patent No. 214,312, dated April 15, 1879; application filed January 16, 1878.

*To all whom it may concern:*

Be it known that I, ALLEN T. PERRY, of Cleveland, in the county of Cuyahoga and State of Ohio, have invented certain new and useful Improvements in Paving and Roofing Compounds; and I do hereby declare the following to be a full, clear, and exact description of the invention, such as will enable others skilled in the art to which it pertains to make and use it.

My invention relates to paving and roofing compounds; and consists, substantially, in the following specified ingredients and the proportion and manner of mixing them.

This compound is produced by combining wax-tailings or still-wax with coal-tar, or gas-tar, or any bituminous product of such tar, or with resin, or with any combination of such tar or bituminous product of such tar with resin.

Wax-tailings or still-wax, as above mentioned, is the last distillate from petroleum, or petroleum-residuum produced after the paraffine and paraffine-oils are obtained. It is of a very thick, waxy, tenacious character, and of about the same specific gravity as water.

The proportions used of each of the above substances in forming my compound vary with the use to which the composition is to be applied, whether for paving or for roofing, and, also, is governed by the temperature and climate to which the compound must be subjected; hence it is impossible to give in this specification an exact formula which would under all circumstances produce the desired compound. A most serviceable composition is obtained by removing by distillation from a quantity of tar all watery matters and all oils which volatilize below a temperature of about 650° Fahrenheit. Then, while the residual bitumen is maintained at a great heat, a suitable quantity of the wax-tailings previously heated is placed with the bitumen in a close tank and thoroughly combined by agitation, produced by any suitable apparatus. The affinity of the one for the other is very strong, and an intimate and fixed union is readily formed if the proper heat—say 500° Fahrenheit—is maintained.

The above is suitable as a roofing compound, and the ingredients used are in the proportion of about forty per cent. of wax-tailings to sixty per cent. of bitumen.

It will be understood that the proportions mentioned herein refer to weight and not to measure.

The combination with resin is formed by heating the resin and wax-tailings to about 450° Fahrenheit, when by agitation the union is readily effected.

For a roofing compound for saturating felt, the compound may be of the consistency of dense thick tar. For covering the saturated felt for roofing the composition should be of such a consistency that when combined with clean gravel or sharp sand upon the roof the heat of summer will not cause it to melt, nor the cold of winter render it liable to crack; and these proportions being so well understood by those skilled in the art to which this invention pertains, and the conditions so widely varying, I consider it unnecessary here to specify any exact formula.

A composition for paving should be of such a character as that, when combined with pulverized calcareous rock or other suitable substance to form a useful pavement, the heat of summer will not soften it, so as to allow the wheels of loaded vehicles to sink or cut through the surface, nor the cold of winter to render the pavement brittle or friable.

Compositions hitherto made from coal-tar or its distilled bitumen have been liable to be influenced by the heat of summer; or, if the bitumen were made hard enough to withstand the summer heat, in winter it is found to have lost its elasticity, become friable and very brittle, and rapidly wastes away by the wear and tear of travel.

In this composition, by the use of the fixed unchanging wax-tailings or still-wax, which only melts at a very considerable degree of heat, combined with the fixed bitumen produced from tar, and which only melts at or about the boiling-point of water, a compound is produced which is a very superior non-conductor of heat, and is consequently well adapted to the uses mentioned.

Another efficient method of producing this compound is to distill the tar to a heat of about 400° Fahrenheit, thus removing all traces of water and the lighter oils, then to combine the necessary proportion of wax-tailings or still-wax, and continue the distillation to the consistency desired, which will generally be found under 700°Fahrenheit.

The wax-tailings may be combined with the raw coal-tar, and the resulting compound distilled together; but I do not recommend this, because of the annoyance found in removing the water from the tar under the most favorable circumstances, which difficulty is vastly increased by combining the wax and tar at the first stage of the process.

It is obvious that the above compound may be useful for other purposes than for paving or roofing. In different proportions a very serviceable compound of the above ingredients may be formed for preserving timber from decay, such timber having previously been well seasoned. A valuable and economical paint also, for preserving iron in exposed situations, may be made from these ingredients, and many other uses not necessary to mention will readily suggest themselves.

I have employed the term "bitumen" not to signify or refer to the substance popularly known as "native asphalt" or "native bitumen," but solely to coal-gas tar resulting from the manufacture of illuminating-gas from bituminous coal.

I am perfectly aware of prior inventions, patented and non-patented, wherein natural asphalt has been employed substantially in the manner that I use my peculiar bitumen, as United States Patent No. 198,260, of date December 18, 1877, also Reissue Patent No. 4,591, dated October 10, 1871, will indicate; but these prior compounds are very different in many essential respects from my compound above specified. They differ in chemical characteristics, in their natural or normal properties, peculiarities, and uses, and in the relative ease, cheapness, certainty, and uniformity in the production of any desired result.

My bitumen or (as has already been specified) distilled non-volatile coal-tar is marked as a distinct chemical substance from natural or native bitumen or asphalt by several tests, among which may be mentioned the following: Natural or native asphalt is readily soluble in turpentine, and also in petroleum or any petroleum distillate. My peculiar bitumen is not thus soluble, with the sole exception of wax-tailings, which will act as a solvent in the manner already shown.

My compound can always be made uniform in density, and any given formula will, if employed, always insure a definite and uniform product, and in this very important particular my compound is greatly superior to any compound wherein native asphalt or bitumen is employed, where the "temper" of the product has always been a result very uncertain, even when a definite formula is employed. Besides this certainty and uniformity of product insured by my invention, which distinguishes my compound wherein distilled coal-tar is used from a similar compound, wherein native asphalt instead of coal-tar is employed, as different from former compounds herein referred to, there is another and very important difference and advantage peculiar to my invention—to wit, the ease, facility, and great comparative cheapness with which the compound herein specified can always be produced.

What I claim is—

1. The composition herein described, consisting of wax-tailings or still-wax with coal-tar or gas-tar, substantially as and for the purpose shown.

2. The composition of wax-tailings or still-wax with any bituminous product resulting from the distillation of coal-tar or gas-tar, substantially as and for the purpose shown.

3. A composition of wax-tailings, coal-tar, and resin, substantially as and for the purpose shown.

4. The combination of wax-tailings or still-wax with bituminous cement distilled from coal-tar and resin, substantially as and for the purposes shown.

5. The combination of wax-tailings with resin, substantially as and for the purposes shown.

In testimony whereof I have signed my name to this specification in the presence of two subscribing witnesses.

ALLEN T. PERRY.

Witnesses:
F. TOUMEY,
W. E. DONNELLY.